(12) United States Patent
Lee et al.

(10) Patent No.: US 11,107,467 B2
(45) Date of Patent: Aug. 31, 2021

(54) METHOD FOR VOICE RECOGNITION AND ELECTRONIC DEVICE FOR PERFORMING SAME

(71) Applicant: Samsung Electronics Co., Ltd., Gyeonggi-do (KR)

(72) Inventors: Dong Kyu Lee, Seoul (KR); Ja Min Goo, Gyeonggi-do (KR); Hyung Woo Kim, Gyeonggi-do (KR); Seung Hyuk Yu, Seoul (KR); Jin Hong Jeong, Gyeonggi-do (KR); Ji Hyun Park, Gyeonggi-do (KR); Kyung Hee Lee, Gyeonggi-do (KR); Ju Yeong Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 120 days.

(21) Appl. No.: 16/321,549

(22) PCT Filed: Jul. 4, 2017

(86) PCT No.: PCT/KR2017/007093
§ 371 (c)(1),
(2) Date: Jan. 29, 2019

(87) PCT Pub. No.: WO2018/038385
PCT Pub. Date: Mar. 1, 2018

(65) Prior Publication Data
US 2019/0172465 A1    Jun. 6, 2019

(30) Foreign Application Priority Data
Aug. 23, 2016    (KR) .................. 10-2016-0106767

(51) Int. Cl.
*G10L 15/22*    (2006.01)
*G10L 21/00*    (2013.01)
(Continued)

(52) U.S. Cl.
CPC .............. *G10L 15/22* (2013.01); *G06F 3/167* (2013.01); *G10L 15/1822* (2013.01);
(Continued)

(58) Field of Classification Search
None
See application file for complete search history.

(56) References Cited

U.S. PATENT DOCUMENTS 7,822,610 B2    10/2010    Burns et al.
7,957,975 B2    6/2011    Burns et al.
(Continued)

FOREIGN PATENT DOCUMENTS

| | | |
|---|---|---|
| JP | 2005-3997 A | 1/2005 |
| JP | 2011-49885 A | 3/2011 |
| JP | 5394739 B2 | 10/2013 |

OTHER PUBLICATIONS

European Search Report dated Jun. 28, 2019.

*Primary Examiner* — Seong-Ah A Shin
(74) *Attorney, Agent, or Firm* — Cha & Reiter, LLC.

(57) ABSTRACT

An electronic device includes an audio input module, a memory storing a speech recognition application, a first application, and a second application, a communication circuit communicating with a first NLU server associated with the first application and a second NLU server associated with the second application, and a processor electrically connected to the audio input module, the memory, and the communication circuit and executing the speech recognition application. The processor is configured to convert an utterance of a user received through the audio input module, into an audio signal, to transmit text data corresponding to the audio signal to the first NLU server and the second NLU server, to receive a first control message as a result of analyzing the text data, from the first NLU server, to receive a second control message as a result of analyzing the text
(Continued)

data, from the second NLU server, to select one of the first control message or the second control message depending on a specified condition, to provide the first control message to the first application, when the first control message is selected, and to provide the second control message to the second application, when the second control message is selected.

11 Claims, 12 Drawing Sheets

(51) Int. Cl.
  *G06F 3/16* (2006.01)
  *G10L 15/30* (2013.01)
  *G10L 15/26* (2006.01)
  *G10L 15/18* (2013.01)
  *G10L 15/32* (2013.01)
(52) U.S. Cl.
  CPC ............. *G10L 15/26* (2013.01); *G10L 15/30* (2013.01); *G10L 15/32* (2013.01); *G10L 2015/223* (2013.01)

(56) References Cited

U.S. PATENT DOCUMENTS

| | | | |
|---|---|---|---|
| 8,315,878 B1 | 11/2012 | Burns et al. | |
| 8,682,676 B2 | 3/2014 | Burns et al. | |
| 8,775,189 B2 | 7/2014 | Burns et al. | |
| 8,812,325 B2 | 8/2014 | Burns et al. | |
| 8,898,065 B2* | 11/2014 | Newman | G10L 15/30 |
| | | | 704/275 |
| 9,070,366 B1 | 6/2015 | Mathias et al. | |
| 9,105,267 B2 | 8/2015 | Okuno | |
| 9,129,591 B2 | 9/2015 | Sung et al. | |
| 9,293,139 B2 | 3/2016 | Burns et al. | |
| 9,361,084 B1 | 6/2016 | Costa | |
| 9,424,840 B1 | 8/2016 | Hart et al. | |
| 9,626,964 B2* | 4/2017 | Hirata | G10L 15/30 |
| 9,734,839 B1* | 8/2017 | Adams | G10L 21/00 |
| 9,966,077 B2* | 5/2018 | Nishikawa | G10L 15/30 |
| 10,026,394 B1 | 7/2018 | Carbon et al. | |
| 10,074,364 B1* | 9/2018 | Wightman | G10L 17/04 |
| 10,271,093 B1* | 4/2019 | Jobanputra | H04N 21/835 |
| 10,453,117 B1* | 10/2019 | Reavely | G06Q 30/0645 |
| 2007/0156411 A1 | 7/2007 | Burns et al. | |
| 2007/0156412 A1 | 7/2007 | Burns et al. | |
| 2007/0174058 A1 | 7/2007 | Burns et al. | |
| 2009/0030698 A1* | 1/2009 | Cerra | G10L 15/183 |
| | | | 704/275 |
| 2011/0010170 A1 | 1/2011 | Burns et al. | |
| 2012/0016678 A1* | 1/2012 | Gruber | G06F 9/54 |
| | | | 704/275 |
| 2012/0191448 A1* | 7/2012 | Lloyd | H04M 1/6075 |
| | | | 704/231 |
| 2013/0073294 A1 | 3/2013 | Burns et al. | |
| 2013/0179154 A1 | 7/2013 | Okuno | |
| 2013/0238336 A1* | 9/2013 | Sung | G10L 15/005 |
| | | | 704/255 |
| 2014/0129222 A1* | 5/2014 | Okamoto | G10L 15/02 |
| | | | 704/243 |
| 2014/0163959 A1* | 6/2014 | Hebert | G06F 40/30 |
| | | | 704/9 |
| 2014/0163995 A1 | 6/2014 | Burns et al. | |
| 2015/0149175 A1* | 5/2015 | Hirata | G10L 15/22 |
| | | | 704/246 |
| 2015/0287413 A1 | 10/2015 | Jung et al. | |
| 2015/0302002 A1 | 10/2015 | Mathias et al. | |
| 2016/0042748 A1 | 2/2016 | Jain et al. | |
| 2017/0116985 A1 | 4/2017 | Mathias et al. | |
| 2017/0236519 A1 | 8/2017 | Jung et al. | |
| 2018/0012597 A1 | 1/2018 | Mathias et al. | |
| 2018/0315425 A1 | 11/2018 | Mathias et al. | |
| 2019/0080696 A1 | 3/2019 | Jung et al. | |

* cited by examiner

METHOD FOR VOICE RECOGNITION AND ELECTRONIC DEVICE FOR PERFORMING SAME

CLAIM OF PRIORITY

This application is a National Phase Entry of PCT International Application No. PCT/KR2017/007093, which was filed on Jul. 4, 2017 and claims a priority to Korean Patent Application No. 10-2016-0106767, which was filed on Aug. 23, 2016, the contents of which are incorporated herein by reference.

TECHNICAL FIELD

The present disclosure relates to a method and an electronic device for recognizing voice.

BACKGROUND ART

A user input interface applied to the electronic device has been recently implemented to support not only a user input (e.g., an input through a button-type keypad, a keyboard, a mouse, a touch panel, or the like) based on the physical manipulation of a user but also the user input based on a voice input.

An electronic device supporting the voice input interface may obtain a user's utterance (or speech) as an input and may convert the user's utterance into an electrical signal. The electronic device may provide the user with useful content based on the electrical signal converted from the voice, or the electrical signal may be used to control the electronic device.

DISCLOSURE

Technical Problem

Various embodiments of the present disclosure is to provide a method and an electronic device that provide a function corresponding to the utterance accurately by analyzing of a user's utterance obtained through a voice input interface, using a plurality of natural language understanding (NLU) servers.

Technical Solution

According to an embodiment of the present disclosure, an electronic device may include an audio input module, a memory storing a speech recognition application, a first application, and a second application, a communication circuit communicating with a first NLU server associated with the first application and a second NLU server associated with the second application, and a processor electrically connected to the audio input module, the memory, and the communication circuit and executing the speech recognition application. The processor may be configured to convert an utterance of a user received through the audio input module, into an audio signal, to transmit text data corresponding to the audio signal to the first NLU server and the second NLU server, to receive a first control message as a result of analyzing the text data, from the first NLU server, to receive a second control message as a result of analyzing the text data, from the second NLU server, to select one of the first control message or the second control message depending on a specified condition, to provide the first control message to the first application, when the first control message is selected, and to provide the second control message to the second application, when the second control message is selected.

Furthermore, according to an embodiment of the present disclosure, a method for recognizing voice may include obtaining voice information corresponding to an utterance of a user, transmitting the voice information to a first natural language understanding (NLU) server associated with a first application and a second NLU server associated with a second application, obtaining first information from the first NLU server and obtaining second information from the second NLU server, in response to the voice information, and executing a function corresponding to the utterance, using at least one of the first application and the second application based at least partly on the first information and the second information.

Moreover, according to an embodiment of the present disclosure, a method for recognizing voice may include converting an utterance of a user into an audio signal, obtaining text data corresponding to the audio signal, transmitting the text data to a first NLU server associated with a first application and a second NLU server associated with a second application, respectively receiving a first control message and a second control message from the first NLU server and the second NLU server as a result of analyzing the text data, selecting one of the first control message or the second control message, depending on a specified condition, and providing the selected control message to an application associated with an NLU server transmitting the selected control message.

Advantageous Effects

According to various embodiments of the present disclosure, an electronic device may receive control messages corresponding to the voice input from a plurality of NLU servers operated and managed by at least one or more entities. Since the electronic device is capable of selecting the most suitable control message among the control messages received from the plurality of NLU servers, the electronic device may recognize the voice input accurately to provide the most suitable function corresponding to the voice input by using an application included in the electronic device. Besides, a variety of effects directly or indirectly understood through the present disclosure may be provided.

MODE FOR INVENTION

Figure 1:
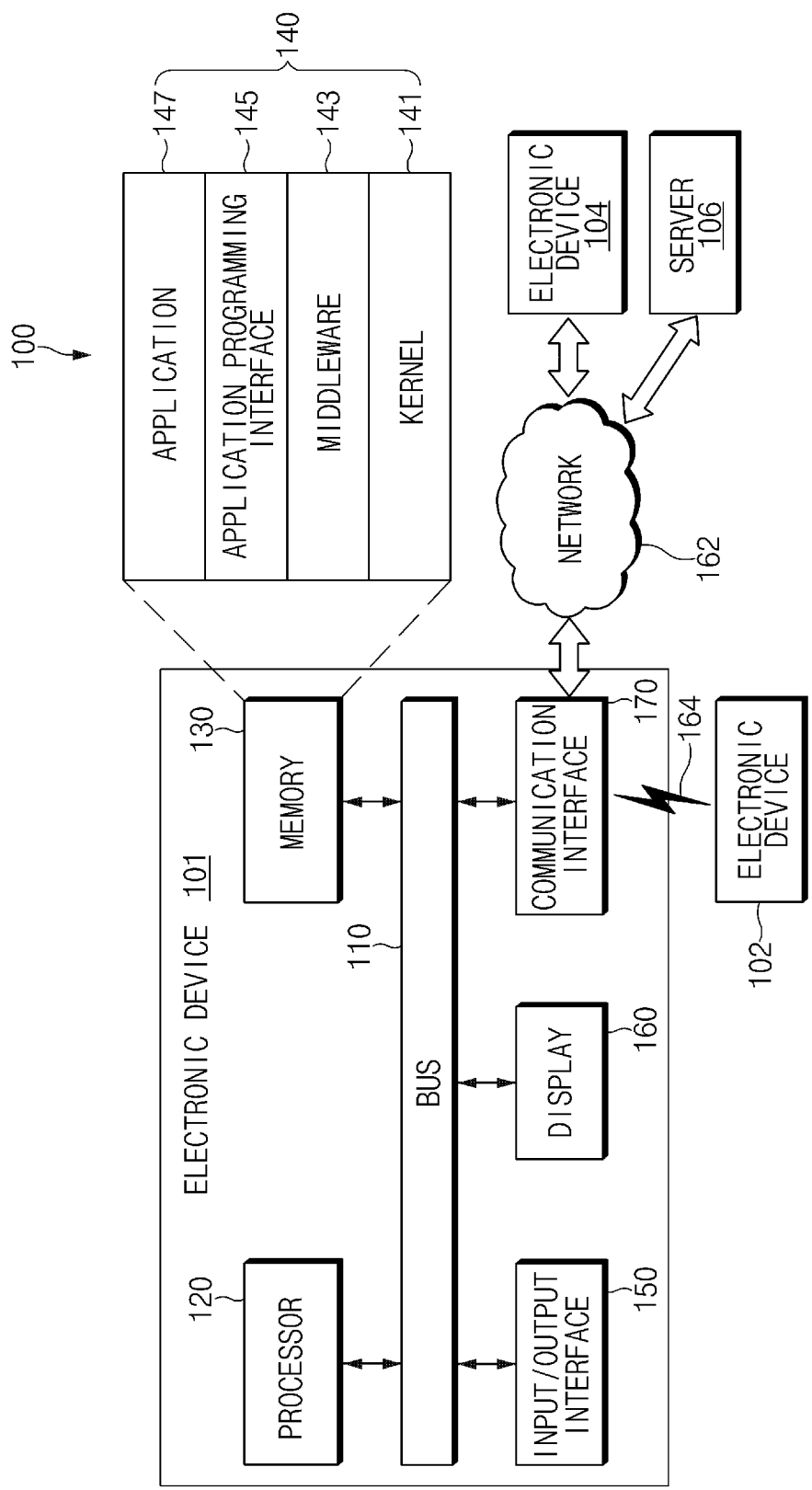
FIG. 1 is a diagram illustrating an electronic device in a network environment, according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device in a network environment system, according to various embodiments.

Referring to FIG. 1, according to various embodiments, an electronic device 101, 102, or 104, or a server 106 may be connected each other over a network 162 or a short range communication 164. The electronic device 101 may include a bus 110, a processor 120, a memory 130, an input/output interface 150, a display 160, and a communication interface 170. According to an embodiment, the electronic device 101 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 101.

The memory 130 may include a volatile and/or nonvolatile memory. For example, the memory 130 may store commands or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 101. Furthermore, the input/output interface 150 may output a command or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, at least one of wireless fidelity (Wi-Fi), Bluetooth, Bluetooth low energy (BLE), Zigbee, near field communication (NFC), magnetic secure transmission (MST), a radio frequency (RF), a body area network (BAN), a global navigation satellite system (GNSS), or the like.

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic device 102 or 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from another device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
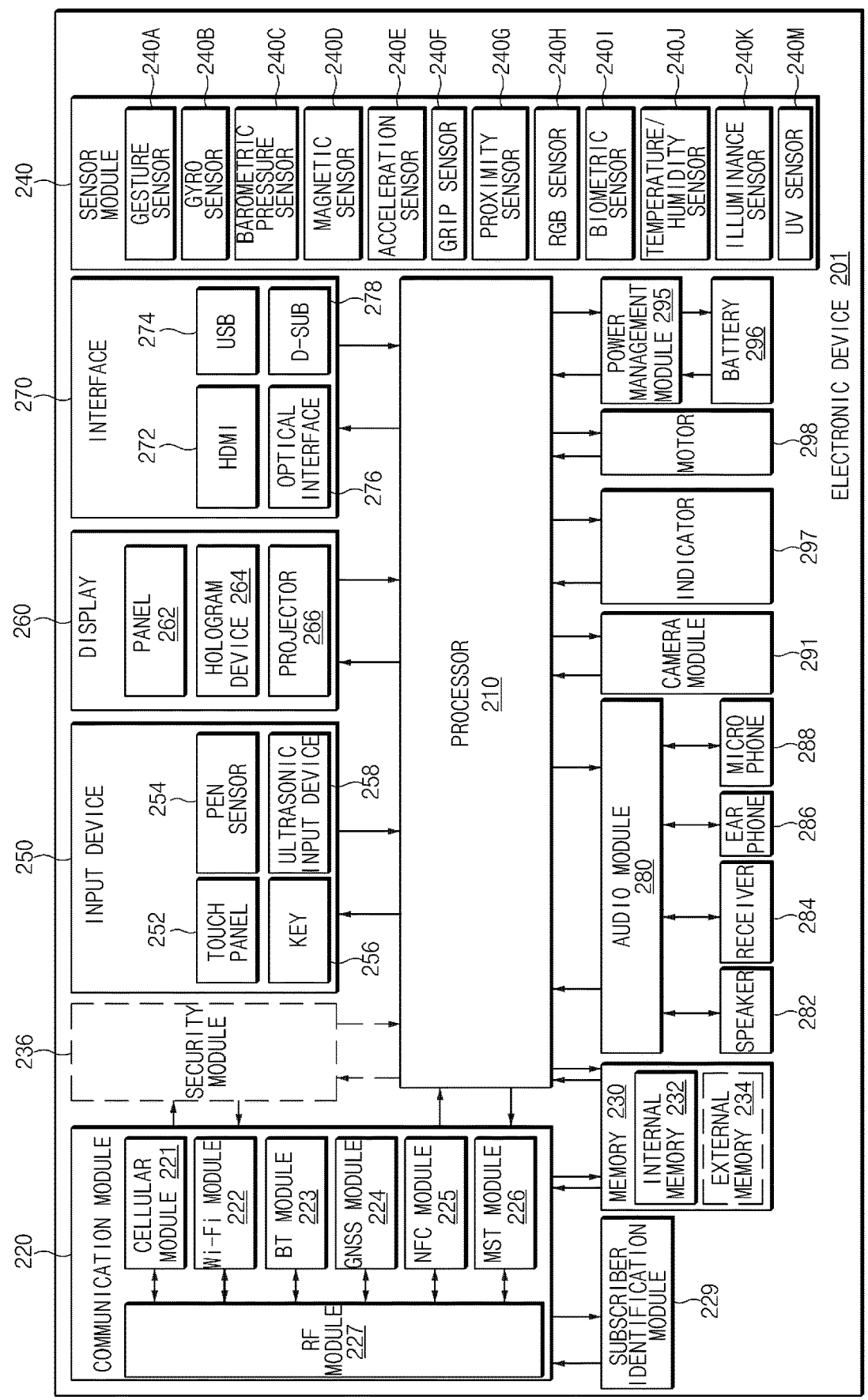
FIG. 2 illustrates a block diagram of the electronic device, according to various embodiments.

FIG. 2 illustrates a block diagram of an electronic device, according to various embodiments.

Referring to FIG. 2, an electronic device 201 may include, for example, all or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226 and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor, interchangeably used hereinafter) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a component of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
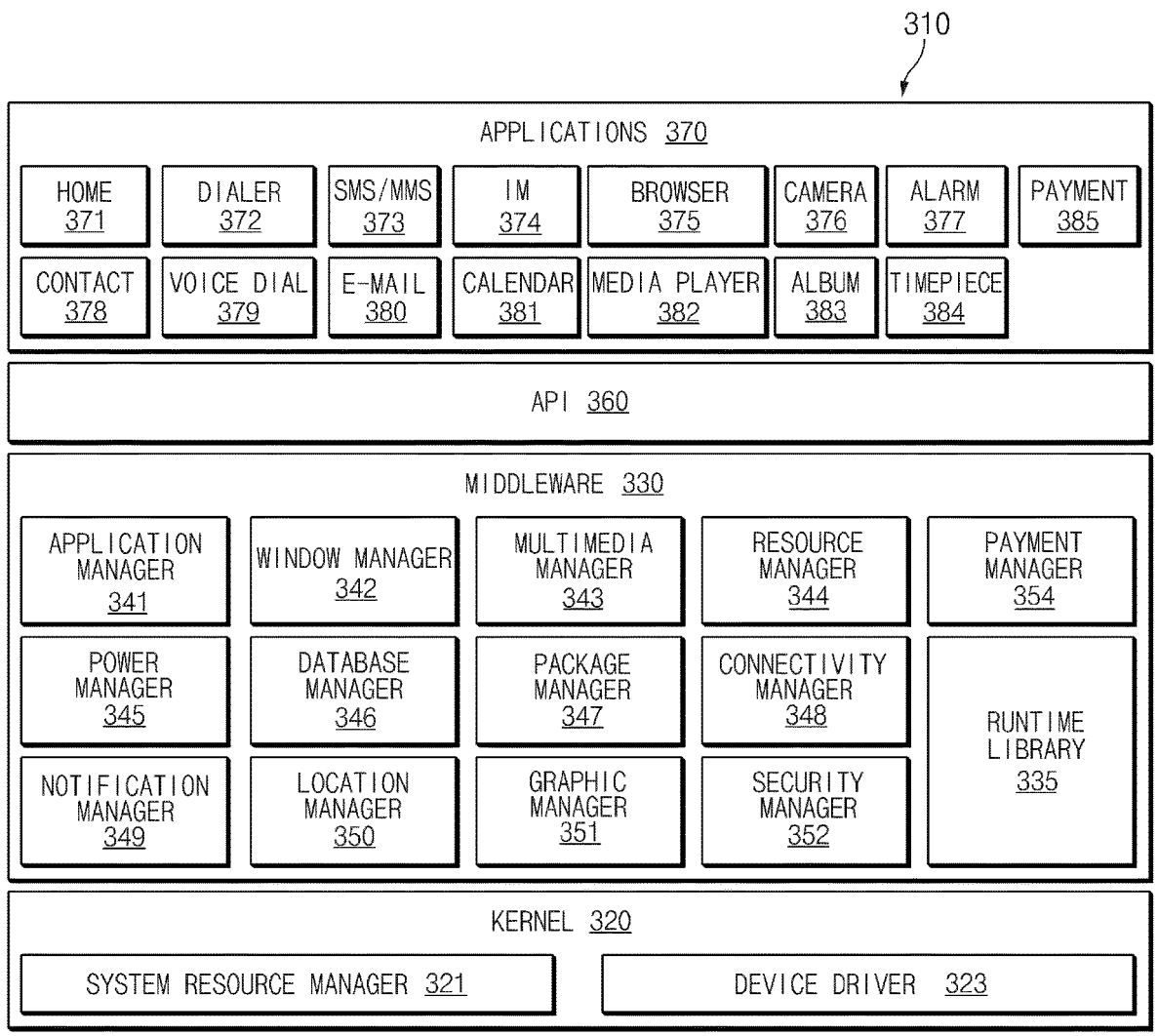
FIG. 3 illustrates a block diagram of a program module, according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (WI) 374, a browser 375, a camera 376, an alarm 377, a contact 378, a voice dial 379, an e-mail 380, a calendar 381, a media player 382, an album 383, a timepiece 384, and a payment 385 or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from an external electronic device (e.g., the electronic device 102 or 104, or the server 106). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4A:
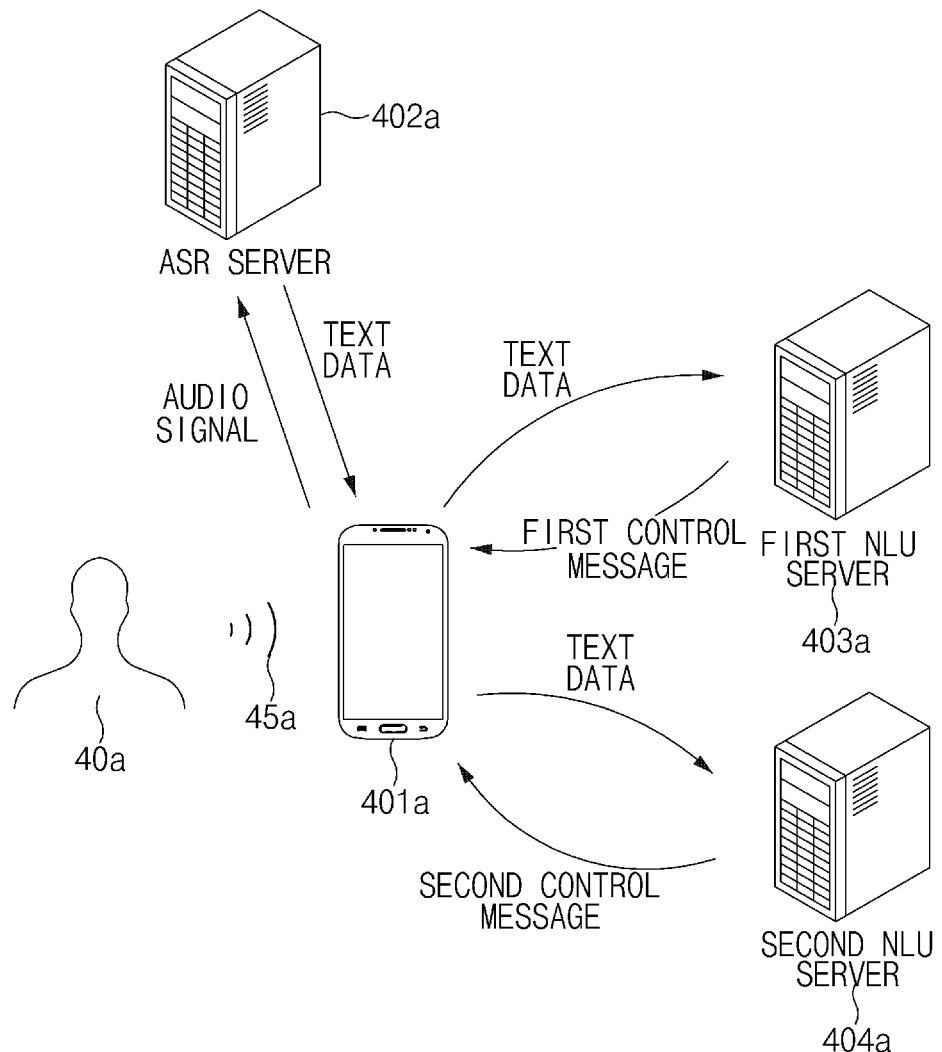
FIGS. 4A to 4C illustrate speech recognition systems, according to various embodiments of the present disclosure.
Figure 4B:
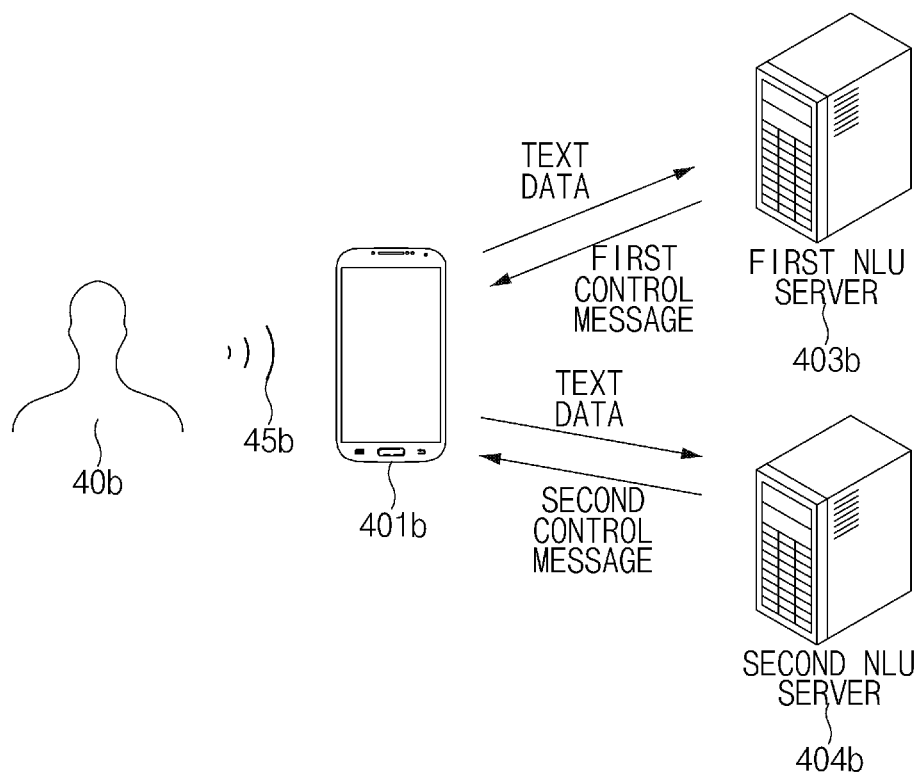
Figure 4C:
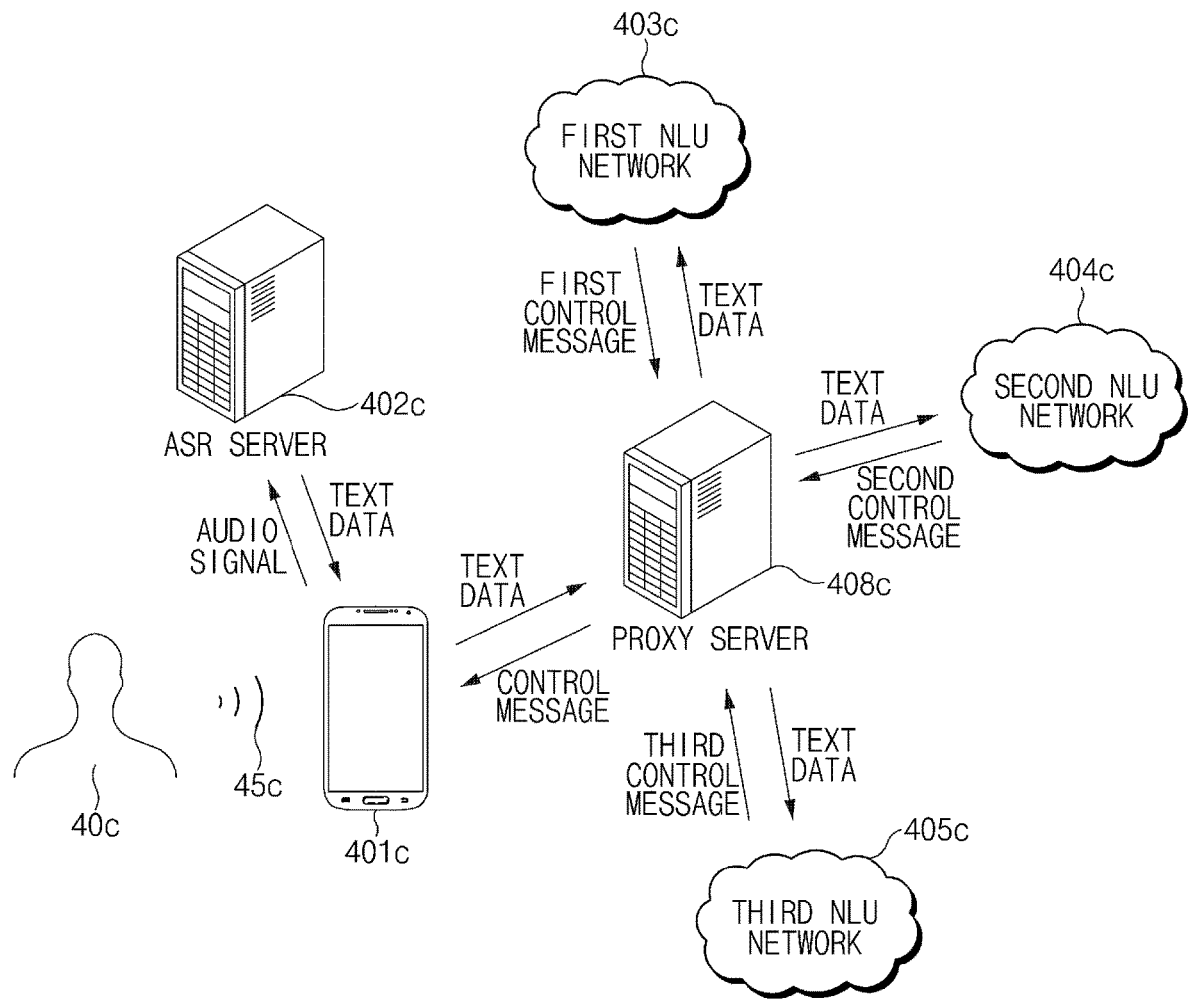

FIGS. 4A to 4C illustrate speech recognition systems, according to various embodiments of the present disclosure.

Referring to FIG. 4A, a speech recognition system according to an embodiment may include an electronic device 401a, an automated speech recognition (ASR) server 402a, a first natural language understanding (NLU) server 403a, and a second NLU server 404a. The electronic device 401a, the ASR server 402a, the first NLU server 403a, and the second NLU server 404a may communicate with one another over a network.

For example, a user 40a may perform utterance (or speech) 45a on the electronic device 401a. For example, the utterance 45a may include a natural language that allows the electronic device 401a to perform a specified function (e.g., the control of operations of hardware/software components included in the electronic device 401a, content search, or the like).

The electronic device 401a may convert the utterance 45a into an audio signal being an electrical signal, using the internal or external audio input module (e.g., a microphone). The electronic device 401a may transmit the audio signal to the ASR server 402a and may receive text data corresponding to the audio signal from the ASR server 402a. For example, the ASR server 402a may extract the utterance 45a of the user included in the audio signal and may generate text data representing the utterance 45a in a specified language to transmit the generated text data to the electronic device 401a.

The electronic device 401a may transmit at least part of the received text data or information corresponding to the received text data to the first NLU server 403a and the second NLU server 404a. The first NLU server 403a and the second NLU server 404a may analyze the meaning of the text data based on various technologies, for example, technologies such as artificial intelligence including machine learning. The first NLU server 403a and the second NLU server 404a may respectively transmit a first control message and a second control message to the electronic device 401a as the analysis result of the text data. For example, the first control message and the second control message may include an instruction for controlling an operation of hardware/software included in the electronic device 401a and/or for providing a service.

The electronic device 401a may select the most suitable control message among the first control message and the second control message depending on a specified condition (or criteria). Afterward, the electronic device 401a may control the hardware/software configuration depending on the selected control message.

Referring to FIG. 4B, a speech recognition system according to another embodiment may include an electronic device 401b, a first NLU server 403b, and a second NLU server 404b. The electronic device 401b, the first NLU server 403b, and the second NLU server 404b may communicate with one another over a network.

For example, a user 40b may perform utterance (or speech) 45b on the electronic device 401b. For example, the utterance 45b may include a natural language that allows the electronic device 401b to perform a specified function.

The electronic device 401b may convert the utterance 45b into an audio signal being an electrical signal, using the internal or external audio input module (e.g., a microphone). The electronic device 401b may extract the utterance 45b of the user included in the audio signal and may generate text data representing the utterance 45b in a specified language. That is, unlike the electronic device 401a illustrated in FIG. 4A, the electronic device 401b may generate the text data without interaction with an ASR server.

The electronic device 401b may transmit at least part of the received text data or information corresponding to the received text data to the first NLU server 403b and the second NLU server 404b. The first NLU server 403b and the second NLU server 404b may analyze the meaning of the text data and may respectively transmit a first control message and a second control message as the analysis result of the text data to the electronic device 401b.

The electronic device 401b may select the most suitable control message among the first control message and the second control message depending on a specified condition (or criteria). Afterward, the electronic device 401b may control the hardware/software configuration depending on the selected control message.

Referring to FIG. 4C, a speech recognition system according to still another embodiment may include an electronic device 401c, an ASR server 402c, a first NLU network 403c, a second NLU network 404c, a third NLU network 405c, and a proxy server 408c. The NLU networks 403c, 404c, and 405c may be classified depending on specific criteria (e.g., the content or service provided by the NLU network). Each of the NLU networks 403c, 404c, and 405c may include at least one NLU server.

For example, a user 40c may perform utterance (or speech) 45c on the electronic device 401c. For example, the utterance 45c may include a natural language that allows the electronic device 401c to perform a specified function.

The electronic device 401c may convert the utterance 45c into an audio signal, using the internal or external audio input module (e.g., a microphone). The electronic device 401c may transmit the audio signal to the ASR server 402c and may receive text data corresponding to the audio signal from the ASR server 402c.

The electronic device 401c may transmit the text data to the proxy server 408c. The proxy server 408c may transmit at least part of the text data or information corresponding to the received text data to the first NLU network 403c, the second NLU network 404c, and the third NLU network 405c. Each of the NLU networks 403c, 404c, and 405c (the NLU server included in each of the NLU networks 403c, 404c, and 405c) may analyze the meaning of the text data; and the NLU networks 403c, 404c, and 405c may transmit a first control message, a second control message, and a third control message as the analysis result of the text data to the proxy server 408c, respectively.

The proxy server 408c may select the most suitable control message among the first control message, the second control message, and the third control message depending on a specified condition (or criteria). The proxy server 408c may transmit the selected control message to the electronic device 401c, and the electronic device 401c may control a hardware/software configuration depending on the transmitted control message.

Figure 5:
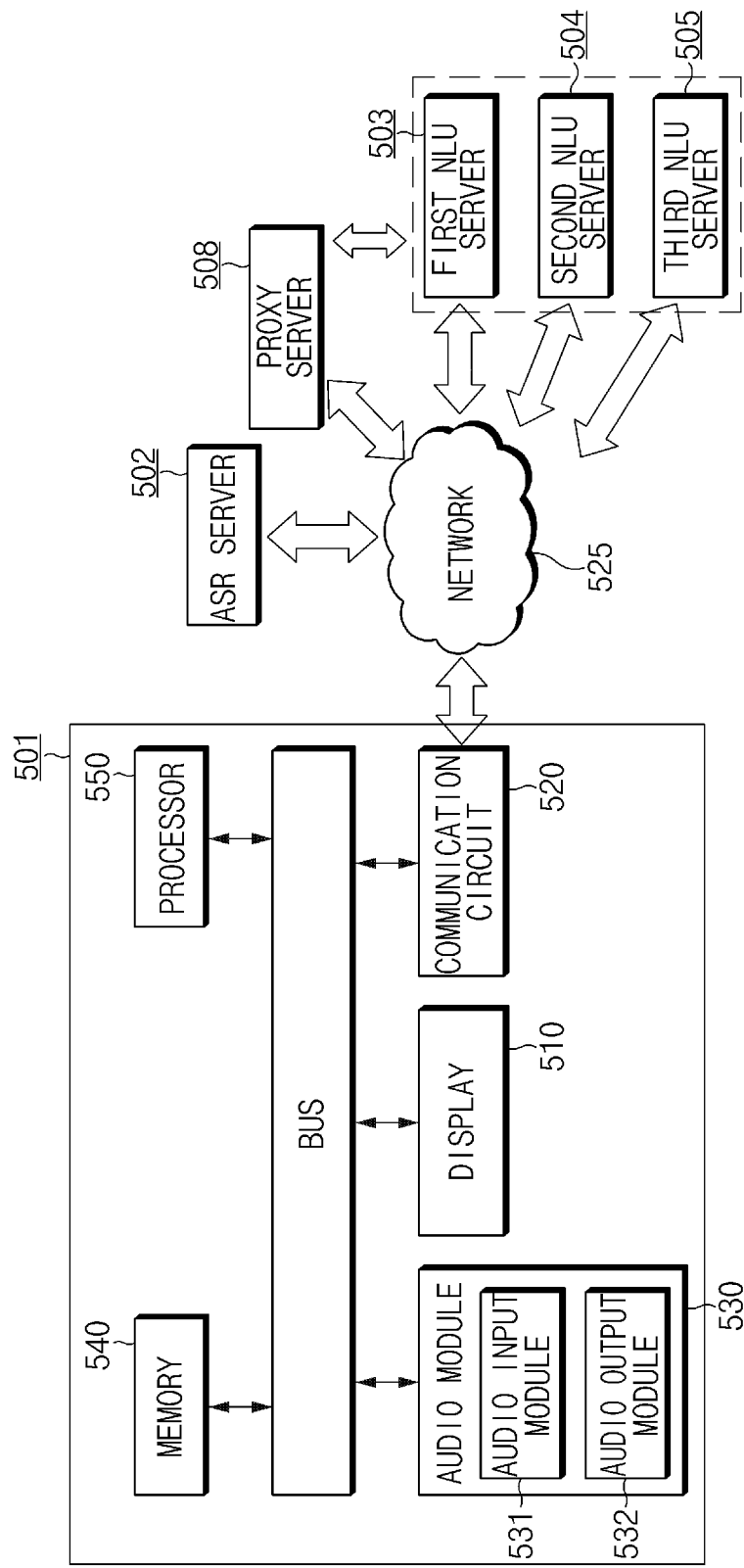
FIG. 5 illustrates a block diagram of an electronic device, according to an embodiment.

FIG. 5 illustrates a block diagram of an electronic device, according to an embodiment.

Referring to FIG. 5, an electronic device 501 according to an embodiment may include a display 510, a communication circuit 520, an audio module 530, a memory 540, and a processor 550. For example, the electronic device 501 may correspond to each of the electronic devices 401a, 401b, and 401c illustrated in FIGS. 4A to 4C. In addition, with regard to the configuration included in the electronic device 501, a description that is the same as the description given with reference to FIGS. 1 to 3 may not be repeated here.

The display 510 may display various pieces of content (e.g., a text, an image, a video, an icon, an object, a symbol, and the like). The display 510 may include a touch screen and may receive, for example, a touch, gesture, proximity, or hovering input using an electronic pen or a part of a user's body.

The communication circuit 520 may communicate with other devices (e.g., servers) over a wired/wireless network. For example, the communication circuit 520 may communicate with an ASR server 502, a first NLU server 503, a second NLU server 504, a third NLU server 505, and a proxy server 508.

The audio module 530 may include an audio input module 531 and an audio output module 532. The audio input module 531 may receive sound (e.g., a user's utterance) generated from the outside to convert the sound into an electrical signal (an audio signal). For example, the audio input module 531 may include a microphone. The audio output module 532 may convert the audio signal into sound. For example, the audio output module 532 may include a speaker, an earphone, or a headphone.

The memory 540 may store various programs or data associated with operations of components included in the electronic device 501. According to an embodiment, the memory 540 may store a speech recognition application (e.g., "S-Voice™", "Bixby™" or the like), a market application (e.g., "Galaxy Apps™", "Play Store™", or the like), a first application, and/or a second application, which has been installed. The first application may be associated with first NLU server 503; the second application may be associated with the second NLU server 504; the market application may be associated with the third NLU server 505. Furthermore, for example, the memory 540 may store instructions that, when executed, cause the processor 550 to perform various operations (e.g., refer to FIGS. 6A and 6B) disclosed in this specification.

For example, the processor 550 may be electrically connected with the various components included in the electronic device 501 and may execute operations or data processing associated with control and/or communication of the components included in the electronic device 501.

According to an embodiment, the processor 550 may execute (or launch) a speech recognition application according to various embodiments of the present disclosure. For example, the speech recognition application may be performed in response to a specified event. The specified event may include a touch input to an icon of the speech recognition application and a triggering voice input (e.g., "Hi Samsung" or "Bixby"). When the speech recognition application is executed, the speech recognition method according to various embodiments of the present disclosure may be initiated, such as the case where the audio input module 531 is activated.

According to an embodiment, the processor 550 may convert a user's utterance received through the audio input module 531 into an audio signal. At this time, for example, the processor 550 may recognize direction of audio (DOA) and may perform edge point detection (EPD). In addition, the processor 550 may perform specified voice processing, for example, removing noise and echo included in the audio signal.

According to an embodiment, the processor 550 may obtain text data corresponding to the audio signal. For example, the processor 550 may transmit the audio signal to the ASR server 502 and may receive the text data from the ASR server 502. For another example, the processor 550 may convert the audio signal into text data itself based on a specified algorithm. Afterward, the processor 550 may transmit the text data to the first NLU server 503, the second NLU server 504, and/or the third NLU server 505.

According to an embodiment, the processor 550 may receive a first control message, a second control message, and/or a third control message from the first NLU server 503, the second NLU server 504, and/or the third NLU server 505 as the analysis result of the text data, in response to the transmission of the text data. For example, the control messages may include a control instruction provided to the hardware (e.g., the display 510, the communication circuit 520, or the like) and/or software (e.g., an application) of the electronic device 501.

According to an embodiment, since the first NLU server 503 is associated with the first application, the first control message received from the first NLU server 503 may be configured to be executed by the first application (the process of the first application). Similarly, since the second NLU server 504 is associated with the second application, the second control message received from the second NLU server 504 may be configured to be executed by the second application (the process of the second application). For example, when the OS installed in the electronic device 501 is Android™, the control instruction may correspond to an explicit intent or an implicit intent.

According to an embodiment, the processor 550 may select one control message among a plurality of control messages (e.g., a first control message, a second control message, and a third control message) received from the plurality of NLU servers 503, 504, and 505, depending on a specified condition (or criteria).

For example, the plurality of control messages may include data indicating the confidence of the analysis result of the text data. In this case, the processor 550 may select a control message, which has the highest confidence, from among the plurality of control messages.

For another example, the memory 540 may store data indicating the execution frequency of each of the installed plurality of applications (e.g., a first application, a second application, or the like). In this case, the processor 550 may select a control message corresponding to an application, which has the highest execution frequency, from among the plurality of applications.

For another example, the memory 540 may store data indicating the execution history of each of the installed plurality of applications (e.g., a first application, a second application, or the like). In this case, the processor 550 may select a control message corresponding to the most recently executed application among the plurality of applications.

For another example, the processor 550 may select a control message, which is received first, from among the plurality of control messages received from the plurality of NLU servers 503, 504, and 505.

According to an embodiment, the processor 550 may provide the selected control message to an application (a process of the application) associated with an NLU server transmitting the selected control message. For example, when the first control message is selected, the processor 550 may provide the first application (a process of the first application) with the first control message. Similarly, when the second control message is selected, the processor 550 may provide the second application (a process of the second application) with the second control message.

According to an embodiment, the processor 550 may perform an operation that the selected control message indicates, depending on the application (the process of the application) receiving the selected control message. For example, the first application receiving the first control message may allow the processor 550 to perform an operation that the first control message indicates. Likewise, the second application receiving the second control message may allow the processor 550 to perform an operation that the second control message indicates.

According to various embodiments, a third control message received from the third NLU server 505 may include an identifier of a recommendation application, a download path of the recommendation application, and/or an instruction associated with the execution of a market application. When a preset condition is satisfied, the processor 550 may execute the market application and may provide a user with a user interface (UI) (e.g., Graphic UI (GUI)) for downloading the recommendation application.

According to an embodiment, when the confidence of each of the first control message received from the first NLU server 503 and the second control message received from the second NLU server 504 is less than a specified value, the processor 550 may provide the market application with the third control message. The market application may allow the processor 550 to output a GUI for downloading the recommendation application to the display 510 based on the third control message.

The above-described operations of the processor 550 are, but are not limited to, an example. For example, operations of a processor described in other parts of this specification should be understood as operations of the processor 550. Also, in this specification, at least some of operations described as operations of an "electronic device" should be understood as operations of the processor 550.

The ASR server 502 may return text data corresponding to the audio signal, to the electronic device 501 in response to an audio signal received from the electronic device 501. According to various embodiments, the ASR server 502 may be referred to as a "speech to text (STT) server", or a "speech recognition (SR) server". According to various embodiments, the function performed by the ASR server 502 may be installed in the electronic device 501 as software.

The first NLU server 503 may be associated with the first application; the second NLU server 504 may be associated with the second application; the third NLU server 505 may be associated with the market application. The NLU servers 503, 504, and 505 may analyze natural languages associated with services or functions provided by applications associated with the NLU servers 503, 504, and 505, respectively. The NLU servers 503, 504, and 505 may respectively determine control messages capable of being provided to applications associated with the NLU servers 503, 504, and 505, as the analyzed result. At this time, the NLU servers 503, 504, and 505 may include the confidence of the analyzed result in the control message.

According to an embodiment, each of the NLU servers 503, 504, and 505 may analyze the meaning of the text data received from the electronic device 501, based on artificial intelligence such as machine learning. Afterward, each of the NLU servers 503, 504, and 505 may transmit a control message as the analysis result of the text data to the electronic device 501.

According to various embodiments, at least one NLU server may establish a NLU network. For example, when a plurality of NLU servers are included in the same NLU network, services or functions provided by applications associated with the plurality of NLU servers may be similar to one another. At this time, linguistic resources for recognizing and analyzing a natural language (e.g., text data) associated with the similar services or functions may be shared among the plurality of NLU servers.

FIG. 5 illustrates only three NLU servers, however, the number and the substance of NLU servers are not limited to the illustrated examples. The NLU server and/or the NLU network may be developed by not only the developer of a speech recognition application but also the third party (e.g., the developer of the first application, or the like).

The proxy server 508 may perform some of the operations capable of being performed by the electronic device 501 (the processor 550 of electronic device 501). For example, the proxy server 508 may receive a text message from the electronic device 501 and may distribute and transmit the text message to each of the NLU servers 503, 504, and 505. The proxy server 508 may receive a plurality of control messages received from the NLU servers 503, 504, and 505 and may select one control message among the plurality of control messages. The proxy server 508 may transmit the selected control message to the electronic device 501.

According to various embodiments, the combination of two or more of the ASR server 502, the first NLU server 503, the second NLU server 504, the third NLU server 505, and the proxy server 508 may be operated in a single server (or a group of servers).

Figure 6A:
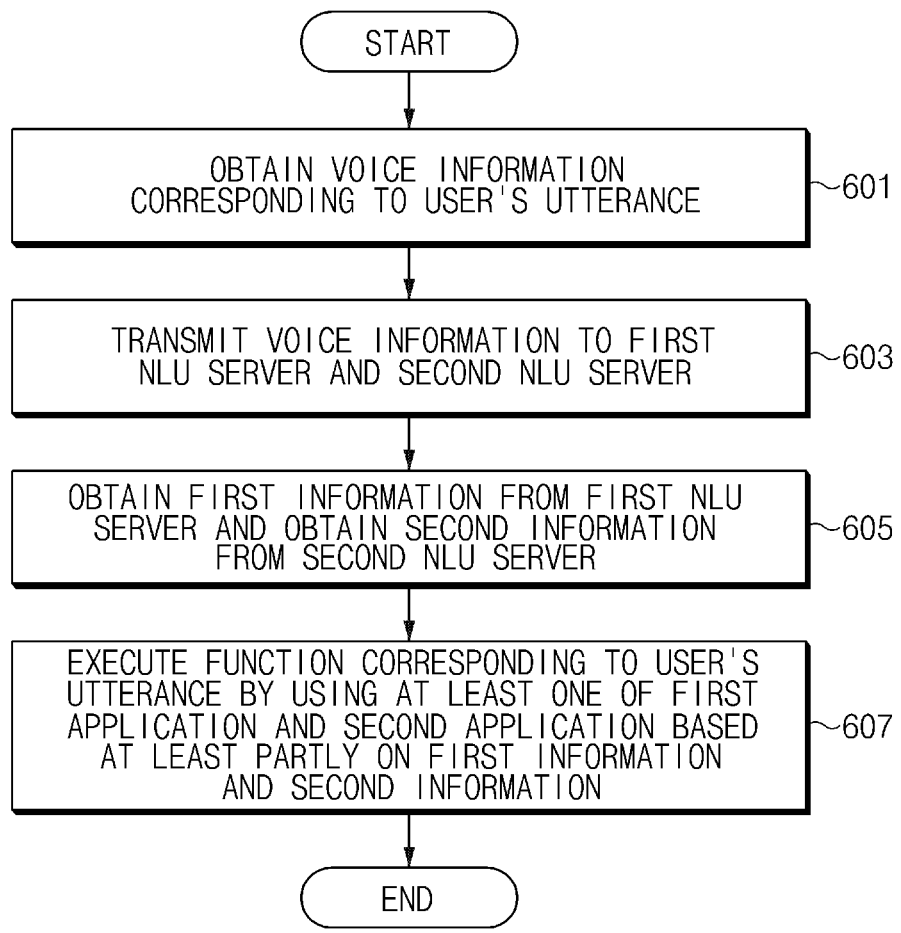
FIGS. 6A and 6B illustrate flowcharts of a method for recognizing voice, according to an embodiment.

FIG. 6A illustrates a flowchart of a method for recognizing voice, according to an embodiment.

Referring to FIG. 6A, the method for recognizing voice according to an embodiment may include operation 601 to operation 607. For example, operation 601 to operation 607 may be performed by the electronic device 401a, 401b, 401c illustrated in FIGS. 4A to 4C or the electronic device 501 illustrated in FIG. 5. Operation 601 to operation 607 may be respectively implemented with, for example, instructions capable of being performed (or executed) by the processor 550 of the electronic device 501. The instructions may be stored in, for example, a computer-readable recording medium or the memory 540 of the electronic device 501 illustrated in FIG. 5 after being included as a part of a speech recognition application. Below, the reference numerals of FIG. 5 may be used to describe operation 601 to operation 607.

In operation 601, the processor 550 of the electronic device 501 may obtain voice information (e.g., text data) corresponding to a user's utterance. According to an embodiment, voice information may include an instruction associated with a service or a function to be provided through the electronic device 501. For example, the voice information may not include application information corresponding to the service or the function to be provided through the electronic device 501. When "A application" provides a service "playing music 'a'", the voice information may correspond to "please play music 'a'" simply.

According to an embodiment, in a state where an application (e.g., "application A") providing a service or a function corresponding to voice information is not executed or launched by the electronic device 501, the processor 550 may obtain the voice information. For example, in a state where the electronic device 501 is in a sleep mode, the processor 550 may obtain the voice information.

For example, the user's utterance may be converted into an audio signal by the audio input module 531. The audio signal may be converted into voice information (text data) by using the ASR server 502 or the computing resource of the processor 550.

In operation 603, the processor 550 of the electronic device 501 may transmit the voice information (text data) to the first NLU server 503 associated with the first application and the second NLU server 504 associated with the second application. According to an embodiment, the processor 550 may transmit voice information to a plurality of NLU servers respectively associated with a plurality of applications installed in the electronic device 501. For example, when 'N' applications are installed in the electronic device 501, the processor 550 may transmit the voice information to 'N' NLU servers respectively associated with the 'N' applications.

According to an embodiment, the processor 550 may transmit voice information to an NLU server associated with some of a plurality of applications installed in the electronic device 501. For example, some application may include an application related to the voice information, a recently used application, a frequently used application, or an application specified by a user.

According to an embodiment, the processor 550 may select some application of the plurality of applications. For example, when the voice information is "please play music 'a'", the processor 550 may select an application (e.g., a music playing application), which is associated with "music", from among a plurality of applications. The processor 550 may transmit the voice information to an NLU server associated with the selected application. According to an embodiment, the processor 550 may transmit the voice information to only some application, which is associated with the voice information, from among the plurality of applications.

In operation 605, the processor 550 of the electronic device 501 may obtain first information (e.g., a first control message or data indicating the confidence of processing result of the first NLU server) from the first NLU server 503 and may obtain second information (e.g., a second control message or data indicating the confidence of processing result of the second NLU server) from the second NLU server 504, in response to the transmission of the voice information (text data).

According to various embodiments, the first information and the second information may include confidence data corresponding to voice information. For example, when the voice information is "please play music 'a'", the first information may include "0.98" being confidence data from analyzing the voice information in the first NLU server, and the second information may include "0.67" being confidence data from analyzing the voice information in the second NLU server.

According to various embodiments, the first information (the first control message) may include identification information of the first application, and the second information (the second control message) may include identification information of the second application.

According to various embodiments, the first information and the second information may include data associated with the voice information. When the voice information is "please play music 'a'", the first information or the second information may include at least one data of "music playback" being a service corresponding to the voice information, "playback" corresponding to the voice information, "a singer's name" corresponding to the voice information, or "music title" corresponding to the voice information. In operation 607, the processor 550 of the electronic device 501 may execute a function corresponding to a user's utterance by using at least one of the first application and the second application based at least partly on the first information (the first control message) and the second information (the second control message).

According to an embodiment, the processor 550 may select at least one of the first application and the second application based at least partly on the first information and the second information. For example, the first information and the second information may include confidence data from analyzing the voice information; when the first information (e.g., 0.98) is greater than the second information (e.g., 0.67), the processor 550 may select the first application among the first application and the second application.

Furthermore, when the first information and the second information includes the identification information of an application, the processor 550 may select at least one of the first application corresponding to the first information and the second application corresponding to the second information.

According to an embodiment, the processor 550 may select at least one application of the first application and the second application based on not only the first information and the second information but also other information corresponding to the first application or the second application. For example, the other information corresponding to the first application or the second application may include the usage frequency of the first application or the second application, user preference information, recent usage history, installation history, or the like. According to an embodiment, the processor 550 may execute a function corresponding to a user's utterance, using the selected application.

Figure 6B:
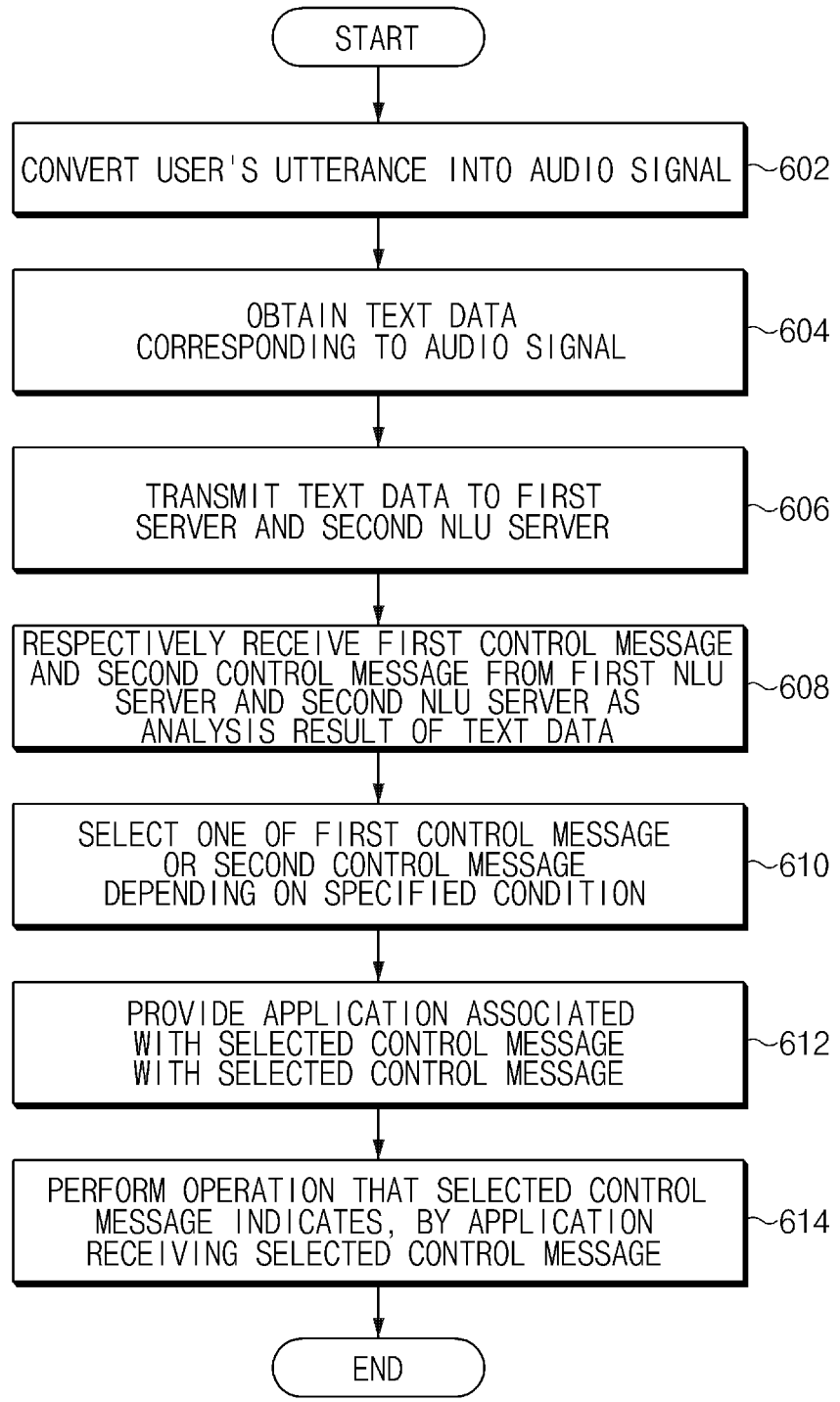

FIG. 6B illustrates a flowchart of a method for recognizing voice, according to another embodiment.

Referring to FIG. 6B, the method for recognizing voice according to an embodiment may include operation 602 to operation 614. Operation 602 to operation 614 may be performed by, for example, the electronic device 501 illustrated in FIG. 5. Operation 602 to operation 614 may be respectively implemented with, for example, instructions capable of being performed (or executed) by the processor 550 of the electronic device 501. The instructions may be stored in, for example, a computer-readable recording medium or the memory 540 of the electronic device 501 illustrated in FIG. 5 after being included as a part of a speech recognition application. Below, operation 602 to operation 614 will be described by using the reference numerals of FIG. 5.

In operation 602, the processor 550 of the electronic device 501 may execute or launch a speech recognition application and may convert a user's utterance received through the audio input module 531 into an audio signal.

In operation 604, the processor 550 of the electronic device 501 may obtain text data corresponding to the audio signal. The audio signal may be converted into voice information (text data) by using the ASR server 502 or the computing resource of the processor 550.

In operation 606, the processor 550 of the electronic device 501 may transmit text data, which is obtained in operation 604, to the first NLU server 503 and the second NLU server 504 through the communication circuit 520.

In operation 608, the processor 550 of the electronic device 501 may receive a first control message and a second control message from the first NLU server 503 and the second NLU server 504 as the analysis result of text data, respectively. For example, the control messages may include a control instruction provided to the hardware (e.g., the display 510, the communication circuit 520, or the like) and/or software (e.g., an application) of the electronic device 501. For example, when the OS installed in the electronic device 501 is Android™, the control instruction may correspond to an explicit intent or an implicit intent.

In operation 610, the processor 550 of the electronic device 501 may select one of the first control message or the second control message depending on the specified condition.

For example, the plurality of control messages (e.g., the first control message or the second control message) may include data indicating the confidence of the analysis result of the text data. In this case, the processor 550 may select a control message, which has the highest confidence, from among the plurality of control messages.

For another example, the memory 540 may store data indicating the execution frequency of each of the installed plurality of applications (e.g., a first application, a second application, or the like). In this case, the processor 550 may select a control message corresponding to an application, which has the highest execution frequency, from among the plurality of applications.

For another example, the memory 540 may store data indicating the execution history of each of the installed plurality of applications (e.g., the first application, the second application, and the like). In this case, the processor 550 may select a control message corresponding to the most recently executed application among the plurality of applications.

For another example, the processor 550 may select a control message, which is received first, from among the plurality of control messages received from the plurality of NLU servers 503 and 504.

In operation 612, the processor 550 of the electronic device 501 may provide an application associated with the selected control message with the control message selected in operation 610. For example, when the first control message is selected, the processor 550 may provide the first application with the first control message. Similarly, when the second control message is selected, the processor 550 may provide the second application with the second control message.

In operation 614, the processor 550 of the electronic device 501 may perform an operation that the selected control message indicates, by an application receiving the selected control message. For example, the first application receiving the first control message may allow the processor 550 to perform an operation that the first control message indicates. Likewise, the second application receiving the second control message may allow the processor 550 to perform an operation that the second control message indicates.

As an exemplary use case, the user may utter "please play Adele's Rolling in the deep" to the electronic device 501. The user's utterance may be converted into an audio signal by the audio input module 531 of the electronic device 501, and the audio signal may be converted into text data by using the ASR server 502 or the computing resource of the electronic device 501. Afterward, the electronic device 501 may transmit the text data corresponding to "please play Adele's Rolling in the deep" to the first NLU server 503 and the second NLU server 504.

The first NLU server 503 and the second NLU server 504 may analyze the text data corresponding to "please play Adele's Rolling in the deep". The first NLU server 503 and the second NLU server 504 may generate a control message (e.g., intent) capable of being executed by an application associated with each NLU server, as the analysis result. The generated control messages may be transmitted to the electronic device 501.

For example, when the first NLU server 503 is associated with a music playback (or streaming) application, the first control message generated by the first NLU server 503 may include an instruction to search for the song "Rolling in the deep" of the singer "Adele" in the device or the web and to play the song by using the audio output module 532 and the confidence (e.g., 0.9) of the corresponding instruction. Also, for example, when the second NLU server 504 is associated with a search engine application, the second control message generated by the second NLU server 504 may include an instruction for searching for the singer "Adele" and the song "Rolling in the deep" by using a search query in a web and outputting the corresponding search result to the display 510 and the confidence (e.g., 0.6) of the corresponding instruction.

The electronic device 501 may receive the first control message and the second control message and may compare the confidence included in the first control message with the confidence included in the second control message. Since the confidence (e.g., 0.9) of the first control message is higher than the confidence (e.g., 0.6) of the second control message, the electronic device 501 may select the first control message. The electronic device 501 may provide the selected first control message to the first application (e.g., a music playing (or a streaming) application). The first application may search for the song "Rolling in the deep" of the singer "Adele" in a device or in a web based on the first control message and may play the song "Rolling in the deep" by using the audio output module 532.

In the meantime, according to various embodiments, a part of operations of the processor 550 of the electronic device 501 may be performed by the proxy server 508 that communicates with the electronic device 501. In addition, the electronic device 501 may perform an operation that the third control message indicates, by receiving a third control message corresponding to text data from the third NLU server 505 associated with the market application. For example, the third control message may include the identifier of a recommendation application, a path for downloading the recommendation application, or the like. The market application may allow the processor 550 to output a GUI for downloading the recommendation application to the display 510 by using the third control message.

Figure 7:
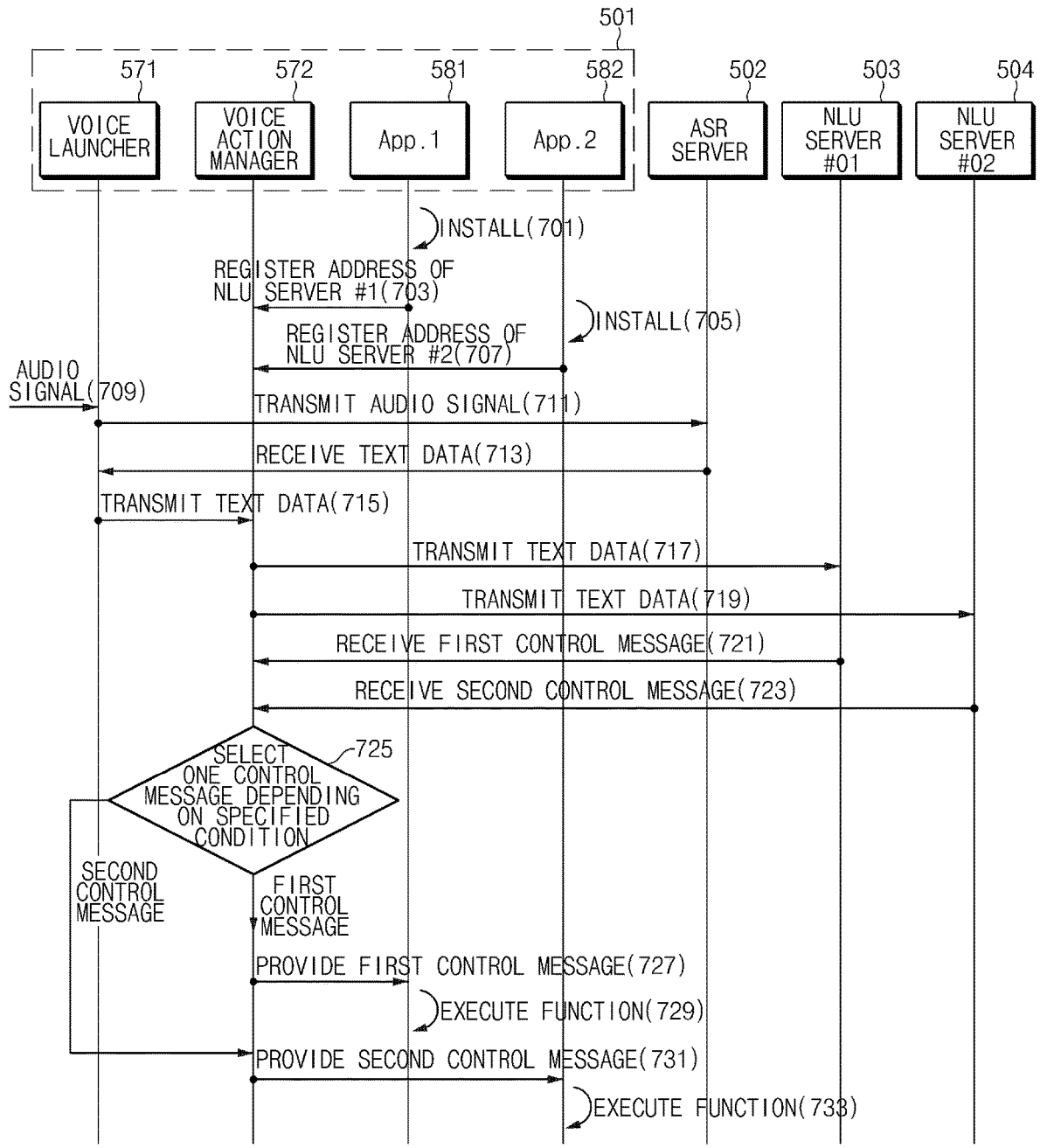
FIG. 7 is a sequence diagram illustrating a method for recognizing voice, according to an embodiment.

FIG. 7 is a sequence diagram illustrating a method for recognizing voice, according to an embodiment.

Referring to FIG. 7, the sequence diagram illustrating the method for recognizing voice according to an embodiment is illustrated. For example, the sequence diagram illustrated in FIG. 7 may indicate an operation of a speech recognition system illustrated in FIG. 4A. Each of a voice launcher 571 and a voice action manager 572 may be a software configuration implemented by the processor 550 depending on the execution of a speech recognition application (e.g., S-Voice™ or "Bixby™").

A first application 581 may be associated with the first NLU server 503. Accordingly, for example, a first control message generated and provided by the first NLU server 503 may be executed by the first application 581. Likewise, a second application 582 may be associated with the second NLU server 504. Accordingly, for example, a second control message generated and provided by the second NLU server 504 may be executed by the second application 582. According to various embodiments, the combination of two or more of the ASR server 502, the first NLU server 503, and the second NLU server 504 may be operated in a single server (or a group of servers).

In the descriptions below, reference numerals of FIG. 5 will be used to describe FIG. 7. It is understood that the operations of the voice launcher 571, the voice action manager 572, the first application 581, and the second application 582 are the operations of the processor 550.

In operation 701, the electronic device 501 may install the first application 581. For example, the processor 550 may download the first application 581 from a market application server by using the market application and may install the first application 581.

In operation 703, the electronic device 501 may register the identification information (URI, URL, or the like) of the first NLU server 503 associated with the first application 581 in the voice action manager 572.

In operation 705, the electronic device 501 may install the second application 582. For example, the processor 550 may download the second application 582 from the market application server by using the market application and may install the second application 582.

In operation 707, the electronic device 501 may register the identification information (URI, URL, or the like) of the second NLU server 504 associated with the second application 582 in the voice action manager 572.

In operation 709, the voice launcher 571 of the electronic device 501 may obtain a user's utterance received through the audio input module 531, as an audio signal. According to various embodiments, operation 709 may be performed in a state where an application associated with an audio signal is not executed in the electronic device 501.

In operation 711, the voice launcher 571 may transmit the audio signal obtained in operation 709, to the ASR server 502.

In operation 713, the voice launcher 571 may receive text data corresponding to the audio signal, from the ASR server 502.

In operation 715, the voice launcher 571 may transmit the text data received from the ASR server 502, to the voice action manager 572.

In operation 717 and operation 719, the voice action manager 572 may transmit the text data to the first NLU server 503 and the second NLU server 504, using the identification information registered in operation 703 and operation 707.

In operation 721 and operation 723, the voice action manager 572 may receive a first control message and a second control message from the first NLU server 503 and the second NLU server 504 as the result of analyzing the text data, respectively. For example, the control messages may include a control instruction capable of being provided to the hardware and/or software (e.g., the first application 581 or the second application 582) of the electronic device 501. For example, when the OS installed in the electronic device 501 is Android™, the control instruction may correspond to an explicit intent or an implicit intent.

In operation 725, the voice action manager 572 may select a control message among the first control message and the second control message depending on a specified condition (or criteria). When selecting the first control message, the voice action manager 572 may perform operation 727; when selecting the second control message, the voice action manager 572 may perform operation 731.

For example, the voice action manager 572 may select a control message, which has the highest confidence, from among the first control message and the second control message. For another example, the voice action manager 572 may select a control message corresponding to an application, which has the highest execution frequency, from among the first application 581 corresponding to the first control message and the second application 582 corresponding to the second control message. For another example, the voice action manager 572 may select a control message corresponding to the most recently executed application among the first application 581 corresponding to the first control message and the second application 582 corresponding to the second control message. For another example, the voice action manager 572 may select the first received control message among the first control message and the second control message.

Since the voice action manager 572 selects the first control message, in operation 727, the voice action manager 572 may provide the first control message to the first application 581.

In operation 729, the first application 581 may perform (or execute) a function operation that the received first control message indicates.

Since the voice action manager 572 selects the second control message, in operation 731, the voice action manager 572 may provide the second control message to the second application 582.

In operation 733, the first application 581 may perform (or execute) a function operation that the received first control message indicates.

Figure 8:
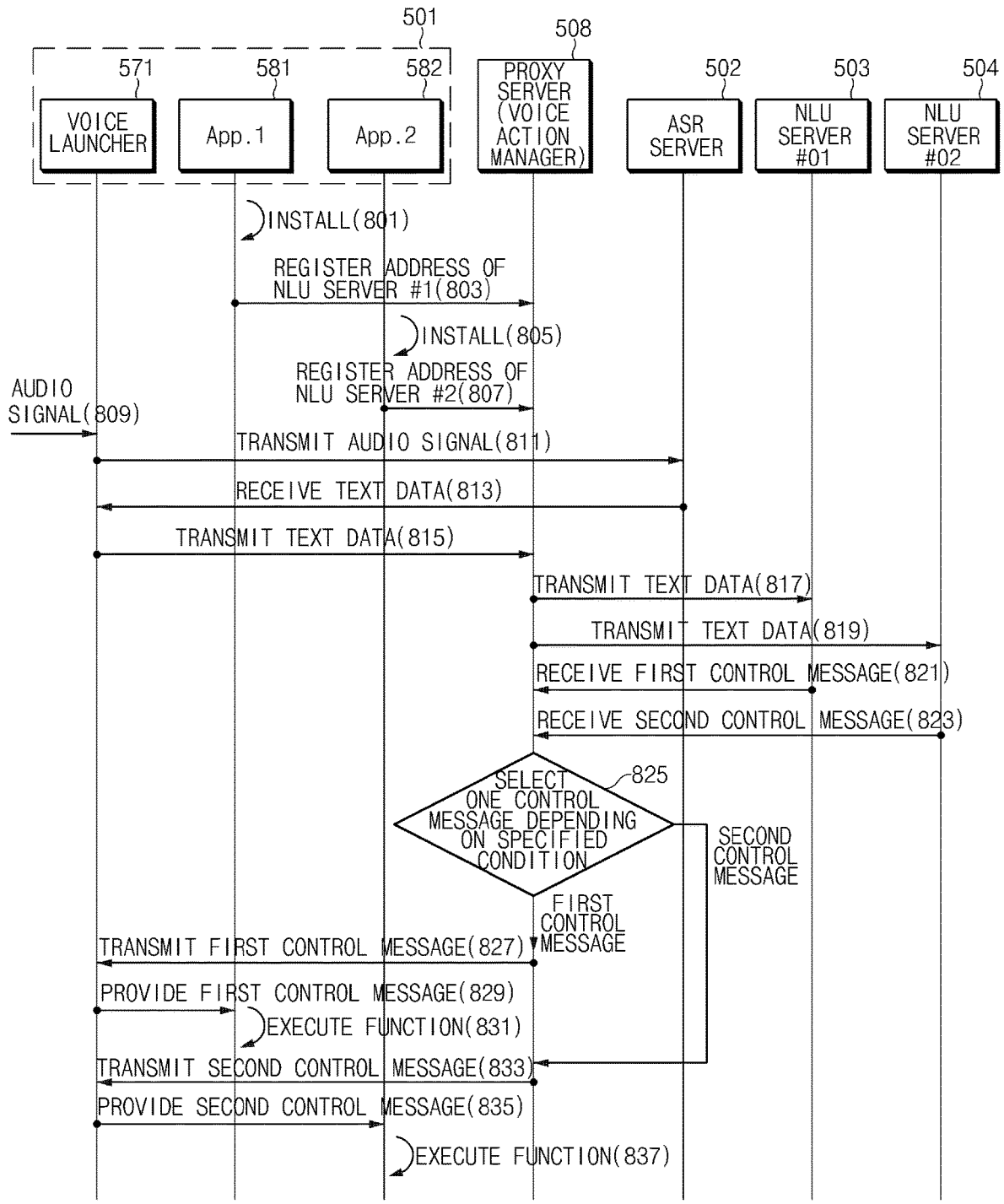
FIG. 8 is a sequence diagram illustrating a method for recognizing voice, according to another embodiment.

FIG. 8 is a sequence diagram illustrating a method for recognizing voice, according to another embodiment.

Referring to FIG. 8, the sequence diagram illustrating the method for recognizing voice according to an embodiment is illustrated. For example, the sequence diagram illustrated in FIG. 8 may indicate an operation of a speech recognition system illustrated in FIG. 4C. The voice launcher 571 may be a software configuration implemented by the processor 550 depending on the execution of a speech recognition application (e.g., S-Voice™ or "Bixby™").

The first application 581 may be associated with the first NLU server 503; the second application 582 may be associated with the second NLU server 504. The proxy server 508 may include a voice action manager (e.g., the voice action manager 572 of FIG. 7). According to various embodiments, the combination of two or more of the ASR server 502, the first NLU server 503, the second NLU server 504, and the proxy server 508 may be operated in a single server (or a group of servers).

In the descriptions below, reference numerals of FIG. 5 will be used to describe FIG. 8. It is understood that the operations of the voice launcher 571, the first application 581, and the second application 582 are the operations of the processor 550.

In operation 801, the electronic device 501 may install the first application 581. For example, the processor 550 may download the first application 581 from a market application server by using the market application and may install the first application 581.

In operation 803, the electronic device 501 may register the identification information (URI, URL, or the like) of the first NLU server 503 associated with the first application 581 in the proxy server 508.

In operation 805, the electronic device 501 may install the second application 582. For example, the processor 550 may download the second application 582 from a market application server by using the market application and may install the second application 582.

In operation 807, the electronic device 501 may register the identification information (URI, URL, or the like) of the second NLU server 504 associated with the second application 582 in the proxy server 508.

In operation 809, the voice launcher 571 of the electronic device 501 may obtain a user's utterance received through the audio input module 531, as an audio signal.

In operation 811, the voice launcher 571 may transmit the audio signal obtained in operation 809, to the ASR server 502.

In operation 813, the voice launcher 571 may receive text data corresponding to the audio signal, from the ASR server 502.

In operation 815, the voice launcher 571 may transmit text data received from the ASR server 502, to the proxy server 508.

In operation 817 and operation 819, the proxy server 508 may transmit the text data to the first NLU server 503 and the second NLU server 504, using the identification information registered in operation 803 and operation 807.

In operation 821 and operation 823, the proxy server 508 may receive a first control message and a second control message from the first NLU server 503 and the second NLU server 504 as the result of analyzing the text data, respectively. For example, the control messages may include a control instruction capable of being provided to the hardware and/or software (e.g., the first application 581 or the second application 582) of the electronic device 501. For example, when the OS installed in the electronic device 501 is Android™, the control instruction may correspond to an explicit intent or an implicit intent.

In operation 825, the proxy server 508 may select a control message among the first control message and the second control message depending on a specified condition (or criteria). When selecting the first control message, the proxy server 508 may perform operation 827; when selecting the second control message, the proxy server 508 may perform operation 833.

For example, the proxy server 508 may select a control message, which has the highest confidence, from among the first control message and the second control message. For another example, the proxy server 508 may select a control message corresponding to an application, which has the highest execution frequency, from among the first application 581 corresponding to the first control message and the second application 582 corresponding to the second control message. For another example, the proxy server 508 may select a control message corresponding to the most recently executed application among the first application 581 corresponding to the first control message and the second application 582 corresponding to the second control message. For another example, the proxy server 508 may select the first received control message among the first control message and the second control message.

Since the proxy server 508 selects the first control message, in operation 827, the proxy server 508 may provide the first control message to the voice launcher 571 of the electronic device 501.

In operation 829, the voice launcher 571 may provide the first application 581 with the first control message received from the proxy server 508.

In operation 831, the first application 581 may perform (or execute) a function operation that the received first control message indicates.

Since the proxy server 508 selects the second control message, in operation 833, the proxy server 508 may provide the second control message to the voice launcher 571 of the electronic device 501.

In operation 835, the voice launcher 571 may provide the second application 582 with the second control message received from the proxy server 508.

In operation 837, the second application 582 may perform (or execute) a function operation that the received second control message indicates.

Figure 9:
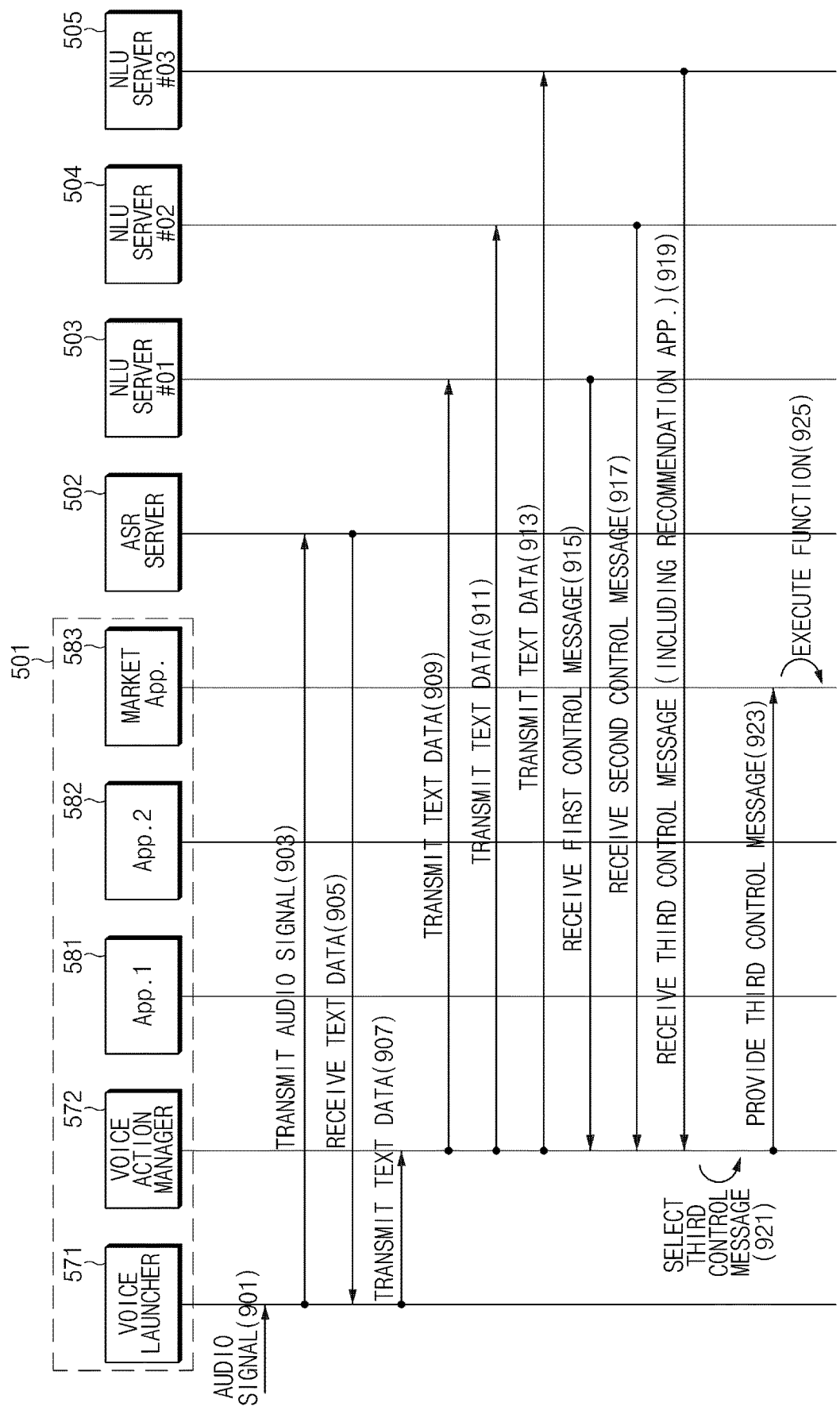
FIG. 9 is a sequence diagram illustrating a method for recognizing voice, according to another embodiment.

FIG. 9 is a sequence diagram illustrating a method for recognizing voice, according to another embodiment.

Referring to FIG. 9, the sequence diagram illustrating the method for recognizing voice according to an embodiment is illustrated. Each of the voice launcher 571 and the voice action manager 572 may be a software configuration implemented by the processor 550 depending on the execution of a speech recognition application (e.g., S-Voice™ or "Bixby™").

The first application 581 may be associated with the first NLU server 503; the second application 582 may be associated with the second NLU server 504. A market application 583 may be associated with the third NLU server 505. Accordingly, for example, a third control message generated and provided by the third NLU server 505 may be executed by the market application 583. According to various embodiments, the combination of two or more of the ASR server 502, the first NLU server 503, the second NLU server 504, and the third NLU server 505 may be operated in a single server (or a group of servers).

In the descriptions below, reference numerals of FIG. 5 will be used to describe FIG. 9. It is understood that the operations of the voice launcher 571, the voice action manager 572, the first application 581, the second application 582, and the market application 583 are the operations of the processor 550.

In operation 901, the voice launcher 571 of the electronic device 501 may obtain a user's utterance received through the audio input module 531, as an audio signal.

In operation 903, the voice launcher 571 may transmit the audio signal obtained in operation 901, to the ASR server 502.

In operation 905, the voice launcher 571 may receive text data corresponding to the audio signal, from the ASR server 502.

In operation 907, the voice launcher 571 may transmit the text data received from the ASR server 502, to the voice action manager 572.

In operation 909 and operation 913, the voice action manager 572 may transmit text data to the first NLU server 503, the second NLU server 504, and the third NLU server 505 by using identification information of the pre-registered NLU server.

In operation 915 to operation 919, the voice action manager 572 may receive a first control message, a second control message, and a third control message from the first NLU server 503, the second NLU server 504, and the third NLU server 505 as the result of analyzing the text data, respectively. For example, the control messages may include a control instruction capable of being provided to the hardware and/or software of the electronic device 501. For example, when the OS installed in the electronic device 501 is Android™ the control instruction may correspond to an explicit intent or an implicit intent.

According to various embodiments, a third control message may include a control instruction associated with the execution of a market application, for example, an identifier of a recommendation application, a download path of the recommendation application, and/or an instruction associated with the execution of a market application.

In operation 921, the voice action manager 572 may select the third control message among the plurality of control messages depending on a specified condition (or criteria). For example, when the confidence of the first control message and the second control message is lower than a specified value, the voice action manager 572 may select the third control message. When first receiving the third control message, the voice action manager 572 may select the third control message. When it is determined that the selecting of the first control message and second control message is not suitable, based on other various conditions, the voice action manager 572 may select the third control message.

Since the voice action manager 572 selects the third control message, in operation 923, the voice action manager 572 may provide the third control message to the market application 583.

In operation 925, the market application 583 may perform (or execute) a function operation that the received third control message indicates. For example, the market application 583 may be executed based on the third control message and may provide a user with a UI for downloading the recommendation application, using the identifier of the recommendation application included in the third control message, a download path included in the third control message, or the like.

According to various embodiments of the present disclosure, an electronic device may receive control messages corresponding to the voice input from a plurality of NLU servers. Since an electronic device is capable of selecting the most suitable control message among the control messages received from the plurality of NLU servers, the electronic device may recognize the voice input accurately and may provide the most suitable function corresponding to the voice input by using an application included in the corresponding electronic device.

According to an embodiment, a method for recognizing voice may include obtaining voice information corresponding to an utterance of a user, transmitting the voice information to a first natural language understanding (NLU) server associated with a first application and a second NLU server associated with a second application, obtaining first information from the first NLU server and obtaining second information from the second NLU server, in response to the voice information, and executing a function corresponding to the utterance, using at least one of the first application and the second application based at least partly on the first information and the second information.

According to an embodiment, the first information may include identification information of the first application, and the second information may include identification information of the second application.

According to an embodiment, a method for recognizing voice may include converting an utterance of a user into an audio signal, obtaining text data corresponding to the audio signal, transmitting the text data to a first NLU server associated with a first application and a second NLU server associated with a second application, respectively receiving a first control message and a second control message from the first NLU server and the second NLU server as a result of analyzing the text data, selecting one of the first control message or the second control message, depending on a specified condition, and providing the selected control message to an application associated with an NLU server transmitting the selected control message.

According to an embodiment, the method for recognizing voice may further include an operation in which an operation that the selected control message indicates, is performed by an application receiving the selected control message.

According to an embodiment, the obtaining the text data may include transmitting the audio signal to an automated speech recognition (ASR) server and receiving the text data from the ASR server.

According to an embodiment, each of the first control message and the second control message may include data indicating a confidence of a result of analyzing the text data, and the selecting may include selecting a control message, the confidence of which is higher, from among the first control message or the second control message.

According to an embodiment, the selecting may include selecting a control message corresponding to an application, the execution frequency of which is the highest, from among the first application and the second application.

According to an embodiment, the selecting may include selecting a control message corresponding to a most recently executed application among the first application and the second application.

According to an embodiment, the selecting may include selecting a control message, which is received first, from among the first control message or the second control message.

According to an embodiment, an electronic device may include an audio input module, a memory storing a speech recognition application, a first application, and a second application, a communication circuit communicating with a first NLU server associated with the first application and a second NLU server associated with the second application, and a processor electrically connected to the audio input module, the memory, and the communication circuit and executing the speech recognition application. The processor may be configured to convert an utterance of a user received through the audio input module, into an audio signal, to transmit text data corresponding to the audio signal to the first NLU server and the second NLU server, to receive a first control message as a result of analyzing the text data, from the first NLU server, to receive a second control message as a result of analyzing the text data, from the second NLU server, to select one of the first control message or the second control message depending on a specified condition, to provide the first control message to the first application, when the first control message is selected, and to provide the second control message to the second application, when the second control message is selected.

According to an embodiment, the first application may cause the processor to perform an operation that the first control message indicates, and the second application may cause the processor to perform an operation that the second control message indicates.

According to an embodiment, the communication circuit may be configured to further communicate with an ASR server, and the processor may be configured to transmit the audio signal to the ASR server and to receive the text data from the ASR server.

According to an embodiment, the processor may be configured to convert the audio signal into the text data based on a specified algorithm.

According to an embodiment, each of the first control message and the second control message may include data indicating a confidence of a result of analyzing the text data, and the processor may be configured to select a control message, the confidence of which is higher, from among the first control message or the second control message.

According to an embodiment, the memory may further store data indicating an execution frequency of the first application and the second application, and the processor may be configured to select a control message corresponding to an application, the execution frequency of which is the highest, from among the first application and the second application.

According to an embodiment, the memory may further store data indicating an execution history of the first application and the second application, and the processor may be configured to select a control message corresponding to the most recently executed application among the first application and the second application.

According to an embodiment, the processor may be configured to select a control message, which is received first, from among the first control message or the second control message.

According to an embodiment, the memory may further store a market application. The communication circuit may further communicate with a third NLU server associated with the market application. The processor may be configured to transmit the text data corresponding to the audio signal to the third NLU server and to receive a third control message including identification information of a recommendation application as a result of analyzing the text data, from the third NLU server.

According to an embodiment, each of the first control message and the second control message may include a confidence of the result of analyzing the text data, and the processor is configured to provide the third control message to the market application, when the confidence of the first control message and the second control message is lower than a specified value.

According to an embodiment, the market application may cause the processor to provide a user interface (UI) for downloading the recommendation application by using the identification information included in the third control message.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for recognizing voice inputs for an electronic device, the method comprising:
 storing in memory a plurality of applications operable with voice inputs;
 obtaining, by a microphone, voice information corresponding to an utterance of a user;
 transmitting, by a communication circuit, the voice information to a first natural language understanding (NLU) server associated with a first application from among the stored plurality of applications and a second NLU server associated with a second application from among the stored plurality of applications, wherein the first and second NLU servers are external to the electronic device;
 receiving by the communication circuit first information from the first NLU server and second information from the second NLU server;
 selecting one of the first and second information based on one of the first and second information having a confidence above a prespecified threshold;
 when both the first and second information have confidences below the prespecified threshold, selecting one of the first and second information based on at least one of:
  which of the first and second information is first received,
  which of the first and second information corresponds to an application with a higher execution frequency, and
  which of the first and second information corresponds to a most recently executed application among the first and second applications; and
 executing, by at least one processor, a function corresponding to the utterance using an application associated with the selected information among the information received from the first and second NLU servers.

2. The method of claim 1, wherein the first information includes a first confidence associated with a result of analyzing the voice information in the first NLU server, and
wherein the second information includes a second confidence associated with a result of analyzing the voice information in the second NLU server.

3. A method for recognizing voice inputs in an electronic device, the method comprising:
storing in memory a plurality of applications operable with voice inputs;
converting, by a microphone, an utterance of a user into an audio signal;
generating, by at least one processor, text data corresponding to the audio signal;
transmitting, by a communication circuit, the text data to a first NLU server associated with a first application from among the stored plurality of applications and a second NLU server associated with a second application from among the stored plurality of applications, wherein the first and second NLU servers are external to the electronic device;
respectively receiving, by the communication circuit, a first control message and a second control message from the first NLU server and the second NLU server after the first and second NLU servers analyze the text data;
selecting one of the first control message or the second control message, based on one of the first and second control messages having a confidence above a prespecified threshold;
when both the first and second control messages have confidences below the prespecified threshold, selecting one of the first and second control messages based on at least one of:
which of the first and second control message is first received,
which of the first and second control message corresponds to an application with a higher execution frequency, and
which of the first and second control message corresponds to a most recently executed application among the first and second applications; and
providing the selected control message to an application associated with one of the first and second NLU servers that transmitted the selected control message.

4. The method of claim 3, wherein each of the first control message and the second control message includes data indicating a confidence of a result of analyzing the text data, and
wherein the selecting includes selecting a control message, the confidence of which is higher, from among the first control message or the second control message.

5. An electronic device comprising:
an audio input module;
a memory configured to store a speech recognition application, a first application, and a second application;
a communication circuit configured to communicate with a first NLU server associated with the first application and a second NLU server associated with the second application, wherein the first and second NLU servers are external to the electronic device; and
a processor electrically connected to the audio input module, the memory, and the communication circuit and configured to execute the speech recognition application, wherein the processor is configured to:
convert an utterance of a user received through the audio input module, into an audio signal;
transmit text data corresponding to the audio signal to the first NLU server and the second NLU server;
receive a first control message as a result of analyzing the text data, from the first NLU server;
receive a second control message as a result of analyzing the text data, from the second NLU server;
select one of the first control message or the second control message, based on one of the first control message or the second control message having a confidence above a prespecified threshold;
when the first and second control messages have confidences below the prespecified threshold, selecting one of the first control message or the second control message based on at least one of:
which of the first and second control messages is first received,
which of the first and second control messages has a higher execution frequency, and
which of the first and second control messages corresponds to a most recently executed application among the first and second applications, and
provide the first control message to the first application, when the first control message is selected; and
provide the second control message to the second application, when the second control message is selected.

6. The electronic device of claim 5, wherein the first application causes the processor to perform an operation that the first control message indicates, and
wherein the second application causes the processor to perform an operation that the second control message indicates.

7. The electronic device of claim 5, wherein the communication circuit is configured to further communicate with an ASR server, and
wherein the processor is configured to:
transmit the audio signal to the ASR server; and
receive the text data from the ASR server.

8. The electronic device of claim 5, wherein the processor is configured to:
convert the audio signal into the text data based on a specified algorithm.

9. The electronic device of claim 5, wherein the memory further stores a market application,
wherein the communication circuit further communicates with a third NLU server associated with the market application, and
wherein the processor is configured to:
transmit the text data corresponding to the audio signal to the third NLU server; and
receive a third control message including identification information of a recommendation application as a result of analyzing the text data, from the third NLU server.

10. The electronic device of claim 9,
wherein, when the third control message is received, the processor is configured to:
select one of the first, second and third control message, based on one of the first, second and third control message having the confidence above the prespecified threshold; and
when the first, second and third control messages all have confidences below the prespecified threshold, selecting one of the first, second and third control messages based on at least one of:
which of the first, second and third control messages is first received, which of the first, second and third control messages has the higher execution frequency, and which of the first, second and third control messages corresponds to the most recently executed application among the first and second applications.

11. The electronic device of claim 10, wherein, when the third control message is selected, the market application causes the processor to provide a user interface (UI) for downloading a recommendation application using the identification information included in the third control message.

* * * * *